S. B. BATCHELOR.
Scythe Snath.
No. 50,891.
Patented Nov. 14, 1865.
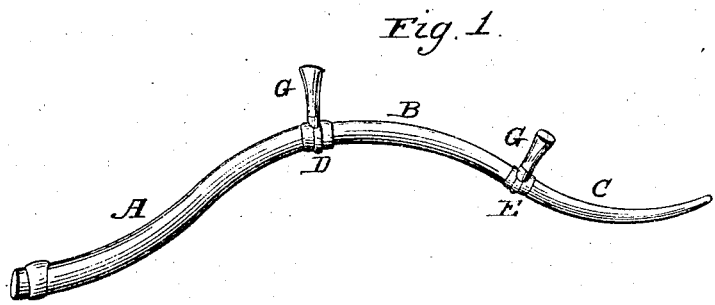
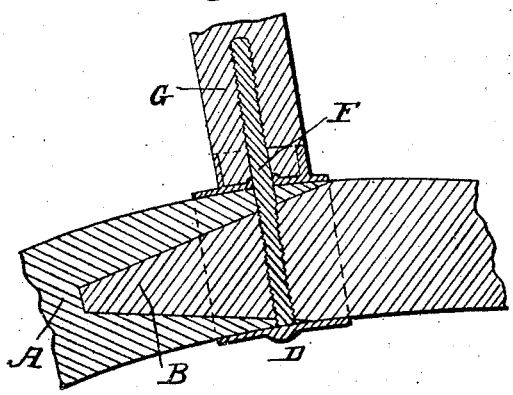 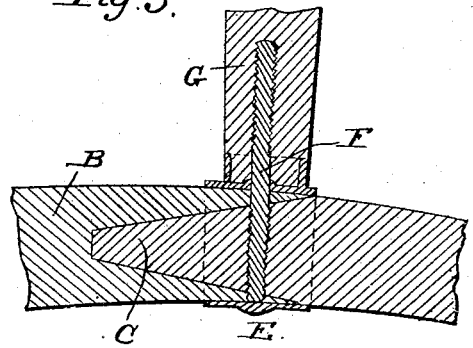

UNITED STATES PATENT OFFICE.

S. B. BATCHELOR, OF LOWVILLE, NEW YORK.

IMPROVEMENT IN SCYTHE-SNATHS.

Specification forming part of Letters Patent No. 50,891, dated November 14, 1865.

*To all whom it may concern:*

Be it known that I, S. B. BATCHELOR, of Lowville, in the county of Lewis and State of New York, have invented a new and Improved Mode in the Manufacture of Scythe-Snaths; and I do hereby declare that the following is a full and exact description thereof, reference being had to the accompanying drawings, and letters of reference marked thereon.

The nature of my invention consists in making a scythe-snath of three distinct pieces of timber instead of one piece, as in the usual mode, thereby saving a large per cent. of labor and timber, as hereinafter described.

In the common mode of manufacturing it is necessary to have the timber clear from knots or defects, making a waste of all the timber not five and a half feet long between the knots. This difficulty is overcome in my invention, no section of the snath being over two and a half feet long. The saving of labor in this new mode is quite equal to the saving in timber, as I am enabled, the snath being made in sections, to turn each piece in a gun-stock lathe instead of continuing the very slow process of making them by hand.

To enable others skilled in the art to make and use my invention, I will proceed to describe its construction.

I make my snath of any kind of timber suitable for the purpose. I saw or rive it into pieces suitable for the snath. The first or lower section of the snath, A, Figure 1, I make of suitable length to reach from the lower nib to the scythe. The center piece or section, B, Fig. 1, I make of suitable length to reach between the top and bottom nibs. The upper or top section, C, Fig. 1, I make fifteen inches long. I bend each section a suitable shape to make a snath when joined together, allowing enough in length on each section to admit of the lap in the joints without making the snath too short. After drying the timber sufficiently while on the molds I place it in the lathes and turn it to the desired shape, so that when each section is secured in its place it forms a complete and durable scythe-snath. On the top end of section A, on the place where the lower nib is put, I place an iron ferrule, D, Fig. 1. I then make a tapering mortise or round hole into the end of section A, at D, as large as the inside of the ferrule and three inches deep, tapering to three-eighths of an inch at the bottom of the hole, as shown in Fig. 2. I make a tenon on the lower end of section B to fit in the hole at D, as shown in Fig. 2. I put the joint together with glue, which makes the snath as strong as it would be without a joint. On the end of section B, where the top nib is put, I place a ferrule, E, Fig. 1, and put the joint together in the same manner as section A and B at D, as shown in Fig. 3. I attach the nibs to the snaths by drilling through the ferrules D and E, into which I screw bolts F F, which are fastened firmly in the nib-woods G G, each of which has a ferrule on its lower end, and by screwing the bolts into the ferrules D and E it fastens the nib firmly to the snath. The bolts F F pass through the tenon in the joints, which prevents the joints from getting out of place by using, as shown at D and E.

What I claim as my invention, and desire to secure by Letters Patent, is—

A scythe-snath constructed of two or more pieces of crooked timber joined together, substantially in the manner and for the purpose herein described.

S. B. BATCHELOR.

Witnesses:
E. S. BATCHELOR,
L. GOLDEN.